(12) United States Patent
Huang

(10) Patent No.: US 11,902,254 B2
(45) Date of Patent: Feb. 13, 2024

(54) BLOCKCHAIN JOINING FOR A LIMITED PROCESSING CAPABILITY DEVICE AND DEVICE ACCESS SECURITY

(71) Applicant: EZBLOCK LTD., Grand Cayman (KY)

(72) Inventor: Rundong Huang, Saratoga, CA (US)

(73) Assignee: EZBLOCK LTD., Grand Cayman (KY)

(*) Notice: Subject to any disclaimer, the term of this patent is extended or adjusted under 35 U.S.C. 154(b) by 0 days.

(21) Appl. No.: 17/932,342

(22) Filed: Sep. 15, 2022

(65) Prior Publication Data

US 2023/0006975 A1 Jan. 5, 2023

Related U.S. Application Data

(62) Division of application No. 16/526,948, filed on Jul. 30, 2019, now Pat. No. 11,489,816.

(60) Provisional application No. 62/712,870, filed on Jul. 31, 2018.

(51) Int. Cl.
*H04L 9/40* (2022.01)
*H04L 9/32* (2006.01)

(52) U.S. Cl.
CPC ........ *H04L 63/0281* (2013.01); *H04L 9/3236* (2013.01); *H04L 63/062* (2013.01); *H04L 63/18* (2013.01); *H04L 63/0272* (2013.01)

(58) Field of Classification Search
CPC ... H04L 63/0281; H04L 63/062; H04L 63/18; H04L 63/0272; H04L 9/3236
USPC .......................................................... 726/12
See application file for complete search history.

(56) References Cited

U.S. PATENT DOCUMENTS

| | | | |
|---|---|---|---|
| 6,247,048 B1 * | 6/2001 | Greer | H04L 69/16 709/227 |
| 10,185,595 B1 | 1/2019 | Ramatchandirane et al. | |
| 2018/0191714 A1 * | 7/2018 | Jentzsch | H04L 9/3247 |
| 2019/0116158 A1 * | 4/2019 | Patil | H04L 69/22 |
| 2019/0163912 A1 * | 5/2019 | Kumar | H04L 41/08 |
| 2019/0287026 A1 | 9/2019 | Calmon et al. | |
| 2019/0312855 A1 | 10/2019 | Sharma et al. | |
| 2020/0045019 A1 | 2/2020 | Huang | |

(Continued)

OTHER PUBLICATIONS

"U.S. Appl. No. 16/526,948, Final Office Action dated Jan. 3, 2022", 16 pgs.

(Continued)

*Primary Examiner* — Michael S McNally
(74) *Attorney, Agent, or Firm* — Schwegman Lundberg & Woessner, P.A.

(57) ABSTRACT

A computer-implement method comprises: selecting a trusted computing node via smart contract on a blockchain; completing remote attestation of the selected trusted computing node; writing secret information to an enclave of the selected node; causing a thin device to establish a private connection with the selected node without revealing the secret information; and causing the selected node to act as a proxy on the blockchain for the device. Another method comprises: receiving a signed device access request from a device owner; validating, by the verification node, the received request; executing, by a verification node, a smart contract on a blockchain based on the received request; and producing, based on the executed smart contract, an output command to access the device for the device to validate, decrypt and execute.

15 Claims, 19 Drawing Sheets

(56) References Cited

U.S. PATENT DOCUMENTS

2020/0387893 A1   12/2020  Maim
2021/0081404 A1    3/2021  Kempf et al.
2021/0203503 A1    7/2021  Soundararajan et al.

OTHER PUBLICATIONS

"U.S. Appl. No. 16/526,948, Non Final Office Action dated Oct. 27, 2021", 17 pgs.
"U.S. Appl. No. 16/526,948, Notice of Allowance dated Jul. 6, 2022", 9 pgs.
"U.S. Appl. No. 16/526,948, Response filed Mar. 31, 2022 to Final Office Action dated Jan. 3, 2022", 9 pgs.
"U.S. Appl. No. 16/526,948, Response filed Dec. 9, 2021 to Non Final Office Action dated Oct. 27, 2021", 11 pgs.
"U.S. Appl. No. 16/526,948, Restriction Requirement dated Sep. 7, 2021", 7 pgs.

\* cited by examiner

BLOCKCHAIN JOINING FOR A LIMITED PROCESSING CAPABILITY DEVICE AND DEVICE ACCESS SECURITY

CROSS REFERENCE TO RELATED APPLICATIONS

This application is a division of and claims the benefit of priority to U.S. application Ser. No. 16/526,948 filed Jul. 30, 2019, which claims priority to U.S. Provisional Application Ser. No. 62/712,870 filed Jul. 31, 2018, which applications are incorporated by reference as if reproduced herein and made a part hereof in their entirety, and the benefit of priority of which is claimed herein.

TECHNICAL FIELD

An embodiment of the present subject matter relates generally to blockchain and, more specifically, to devices with limiting processing capability to join a blockchain and enhanced security therefore.

BACKGROUND

To support massive number of devices and blockchain transactions, a blockchain needs to be highly scalable, high performance, secure, and support very frequent micropayments. Further, participating nodes in the blockchain must have a minimum processing capability.

SUMMARY

In an embodiment, a computer-implement method comprises: selecting a trusted computing node via smart contract on a blockchain; completing remote attestation of the selected trusted computing node; writing secret information to an enclave of the selected node; causing a thin device to establish a private connection with the selected node without revealing the secret information; and causing the selected node to act as a proxy on the blockchain for the device.

The smart contract may include hardware parameters of the selected computing node. The method may further comprise transmitting secret keys of the device to the selected node via secure channel. The causing the selected node to act as a proxy may include performing a transaction on the blockchain on behalf of the device.

In an embodiment, a computer-implemented method comprises: receiving a signed device access request from a device owner; validating, by the verification node, the received request; executing, by a verification node, a smart contract on a blockchain based on the received request; and producing, based on the executed smart contract, an output command to access the device for the device to validate, decrypt and execute.

The smart contract may contain binding logic between the device and the device owner signed by the device owner using a private key of the device. The smart contract may be a multi-party signature binding. The output command may comprise encrypted results of the executed smart contract and a Merkle proof of the results to prove correctness of the contract execution results.

The method may further comprise causing the device to validate the received output command by confirming validators on device match validators that signed the output command. The method may further comprise causing updating of the validators on the device using the validators to validate a new set of validators. The method may further comprise causing the verification node to complete block generation and voting on the generated block.

The method may further comprise storing a private key on a verification node; deploying the verification node in a private cloud; and deploying an access node in a public cloud, the access node communicatively coupled to the thin node.

Embodiments also comprise a machine-readable storage device embodying instructions that, when executed by a machine, cause the machine to perform the methods above.

Embodiments also comprise a system comprising one or more processors of a machine; and a memory storing instruction that, when executed by the one or more processors, cause the machine to perform the method above.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 19 is a block diagram illustrating components of a machine, according to some example embodiments, able to read instructions from a machine-readable medium (e.g., a

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Currently, blockchains require their participating nodes to meet certain requirements on resources, e.g. computing power, network bandwidth and storage space, which limits the blockchain's application in IoT. Embodiments enable devices with limited processing capabilities to participate in blockchain with the help of a proxy that supports trusted computing.

For example, embodiments enable a weak device to
- Start a transaction and initiate the execution of a smart contract
- Monitor the execution of transactions in the blockchain and act based on a transaction's result.
- Integrate with the blockchain's messaging system
- Store its data using cloud or decentralized storage.

By leveraging trusted computing, embodiments enable IoT devices to perform necessary operations on a blockchain without sacrificing its own security while keeping the resource requirements low. Security is further enhanced by random selection of proxies and resource demand can be further reduced by using UDP for communication and simple symmetric encryption.

The communication between the server and the device is changed from a traditional network layer encryption scheme (VPN) to a message encryption scheme. Each IoT device and the server use a unique key pair communicates.

By adopting blockchain technology and data encryption technology, core secrets such as the private keys are located on the private server, and the public cloud server has no core secret. Blockchain smart contract makes the authentication of IoT devices programmable and extendable.

Figure 1:
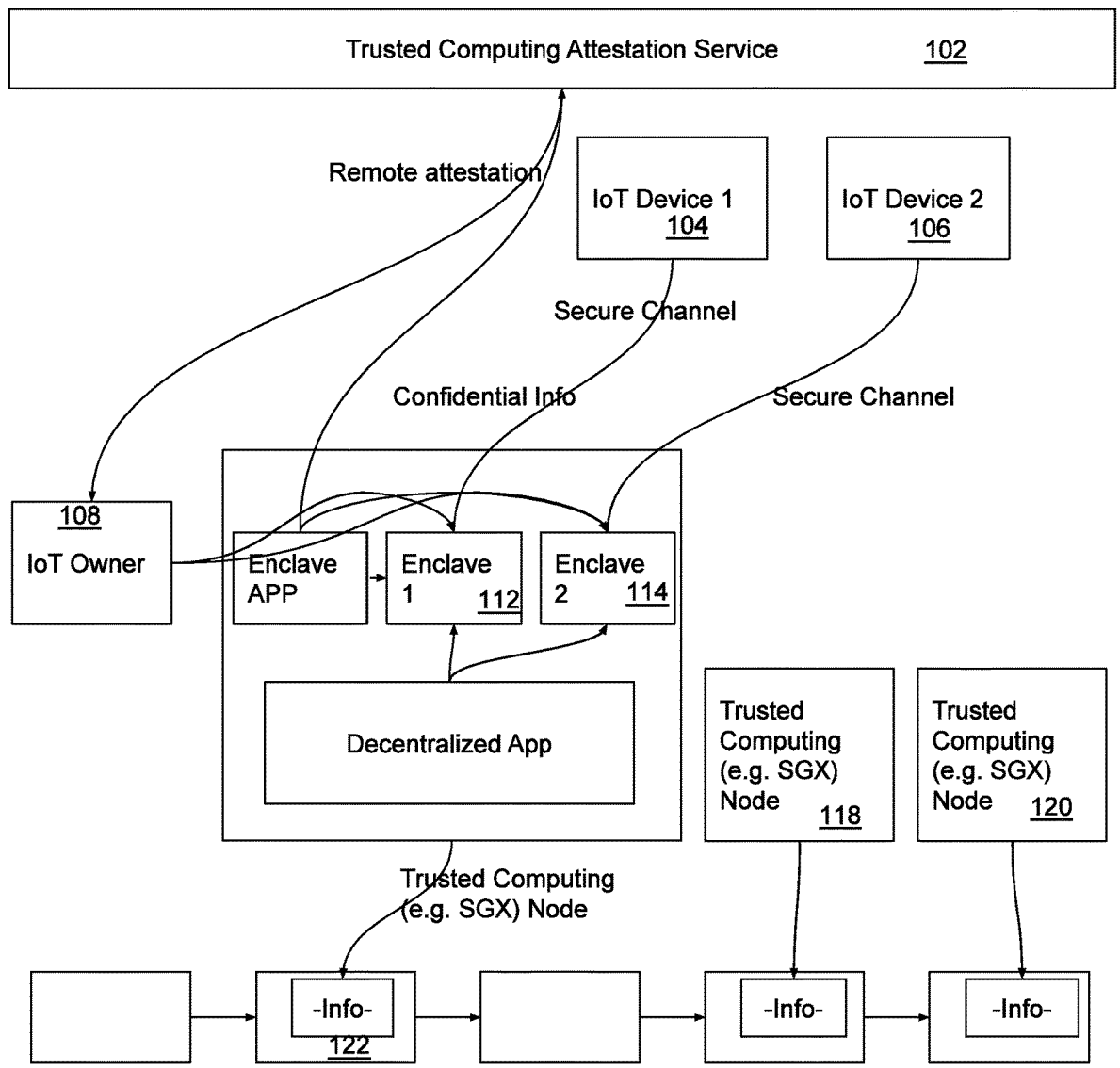
FIG. 1 is a block diagram illustrating Trusted computing node and IoT device architecture.

FIG. 1 is a block diagram illustrating Trusted computing node and IoT device architecture 100. In an embodiment, weak devices 104, 106 participate in blockchain operations via a proxy capable of trusted computing.

A node 118 or 120 capable of trusted computing (e.g. SGX) node declares its own capabilities in the blockchain in the form of a smart contract, which includes information about the node's trusted computing (e.g. SGX) enclave such as hardware parameters, ways to access and price for its computation.

The owner 108 of IoT weak devices 104, 106 (IoT Owner) selects a trusted computing (e.g. SGX) Node 118 or 120 based on information 122 left in the blockchain and establish connections with the node.

IoT Owner 108 completes remote attestation 102 of the selected trusted computing (e.g. SGX) Node 118 or 120 according to the published specification and considers the trusted computing (e.g. SGX) Node trustworthy, before writing secret information to enclaves 112 and/or 114 created on the trusted computing (e.g. SGX) Node.

Based on secret information provided by IoT Owner 108, an IoT device 104 or 106 establishes private connection with the trusted computing (e.g. SGX) Node 118 or 120, without revealing private data to the node itself. Afterwards, an enclave 112 or 114 within the trusted computing (e.g. SGX) Node acts as a proxy for the IoT device for all the operations on the blockchain, including starting transactions and monitoring them, sending and receiving messages, storing data etc.

Figure 2:
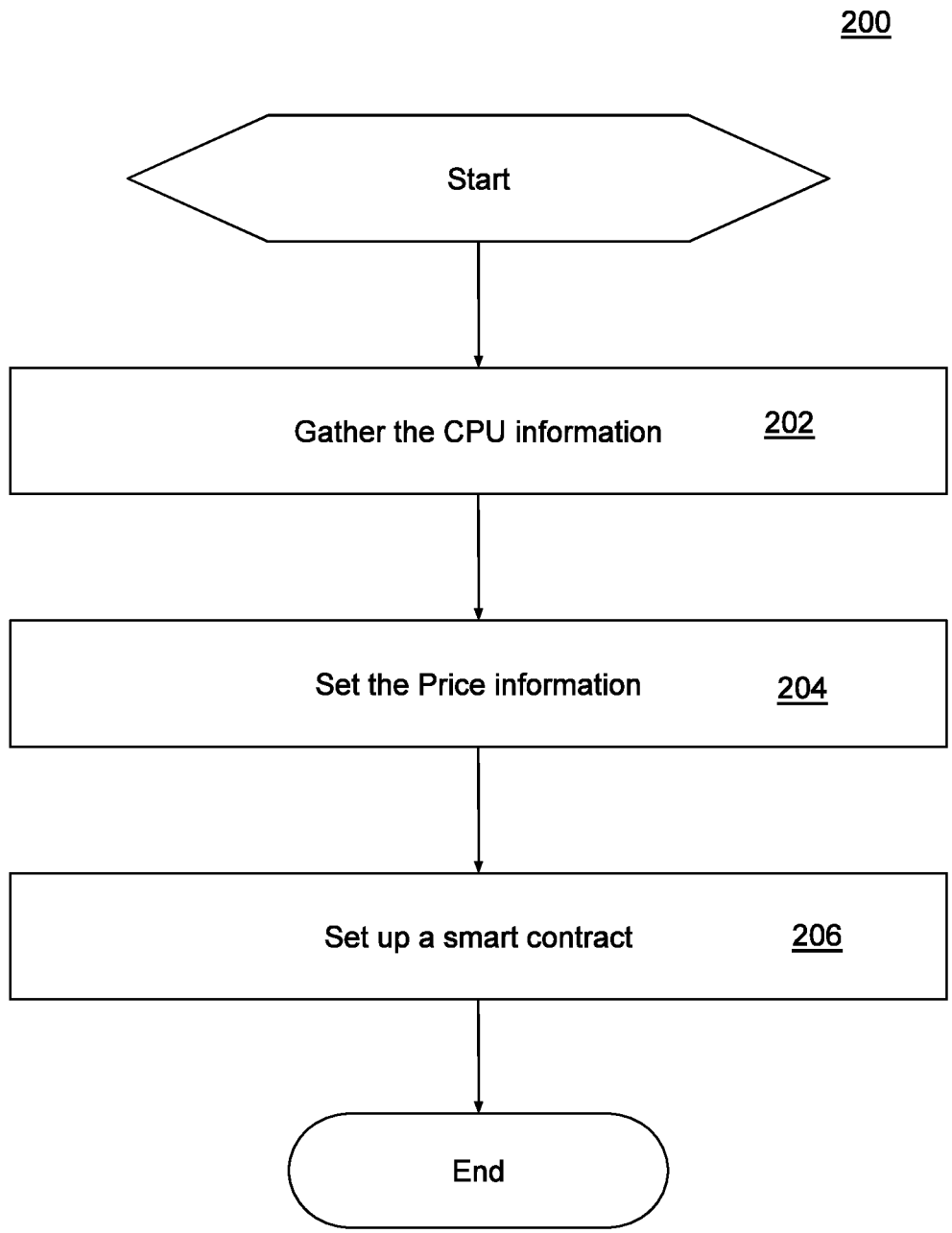
FIG. 2 is a flow chart illustrating a Trusted computing node declaration procedure.

FIG. 2 is a flow chart illustrating a Trusted computing node declaration procedure 200. In a blockchain, trusted computing (e.g. SGX) Nodes can earn profits by charging a fee for providing trusted computing services, which will be paid by IoT Owners. A trusted computing (e.g. SGX) Node declares the following information on the blockchain in the form of a smart contract:

Hardware parameters, especially those regarding the CPU 202

Price for providing trusted computing services 204

Access information such as the trusted computing (e.g. SGX) Node's IP address is not part of the smart contract, which would expose surface for attack. After an IoT Owner has sent relevant information to the smart contract created 206 by the trusted computing (e.g. SGX) Node, access information will be sent by the trusted computing (e.g. SGX) Node to the IoT Owner through a private channel.

An IoT Owner can audit a trusted computing (e.g. SGX) Node based on information provided in the smart contract.

Figure 3:
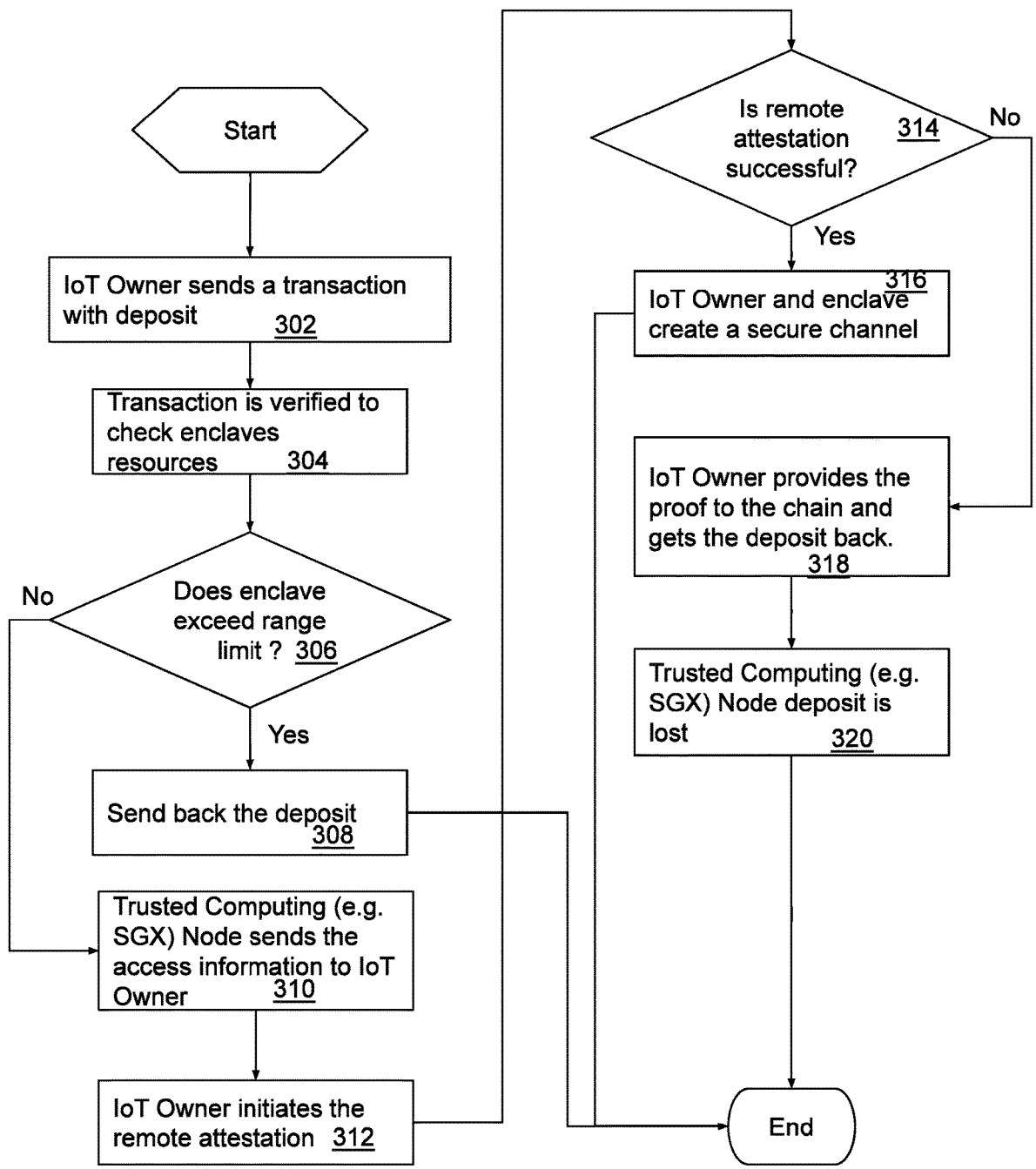
FIG. 3 is a flow chart illustrating Remote attestation service procedure.

FIG. 3 is a flow chart illustrating Remote attestation service procedure 300. Once it has obtained necessary access information about the trusted computing (e.g. SGX) node, the IoT Owner starts remote attestation for the trusted computing (e.g. SGX) Node to ensure the trustworthiness of the latter.

IoT Owner sends a transaction with deposit 302. Next, Transaction is verified to check enclaves resources 304. If the enclave exceeds resources needed 306, the deposit is returned 308 and the method 300 ends. Otherwise, Trusted Computing (e.g. SGX) Node sends the access information to the IoT Owner 310 and the IoT Owner initiates remote attestation 312. If attestation is successful 314, the IoT owner and enclave create a secure channel 316 and the method 300 ends. If not, IoT Owner provides the proof to the chain and gets the deposit back 318 and Trusted Computing (e.g. SGX) Node deposit is lost 320.

Figure 4:
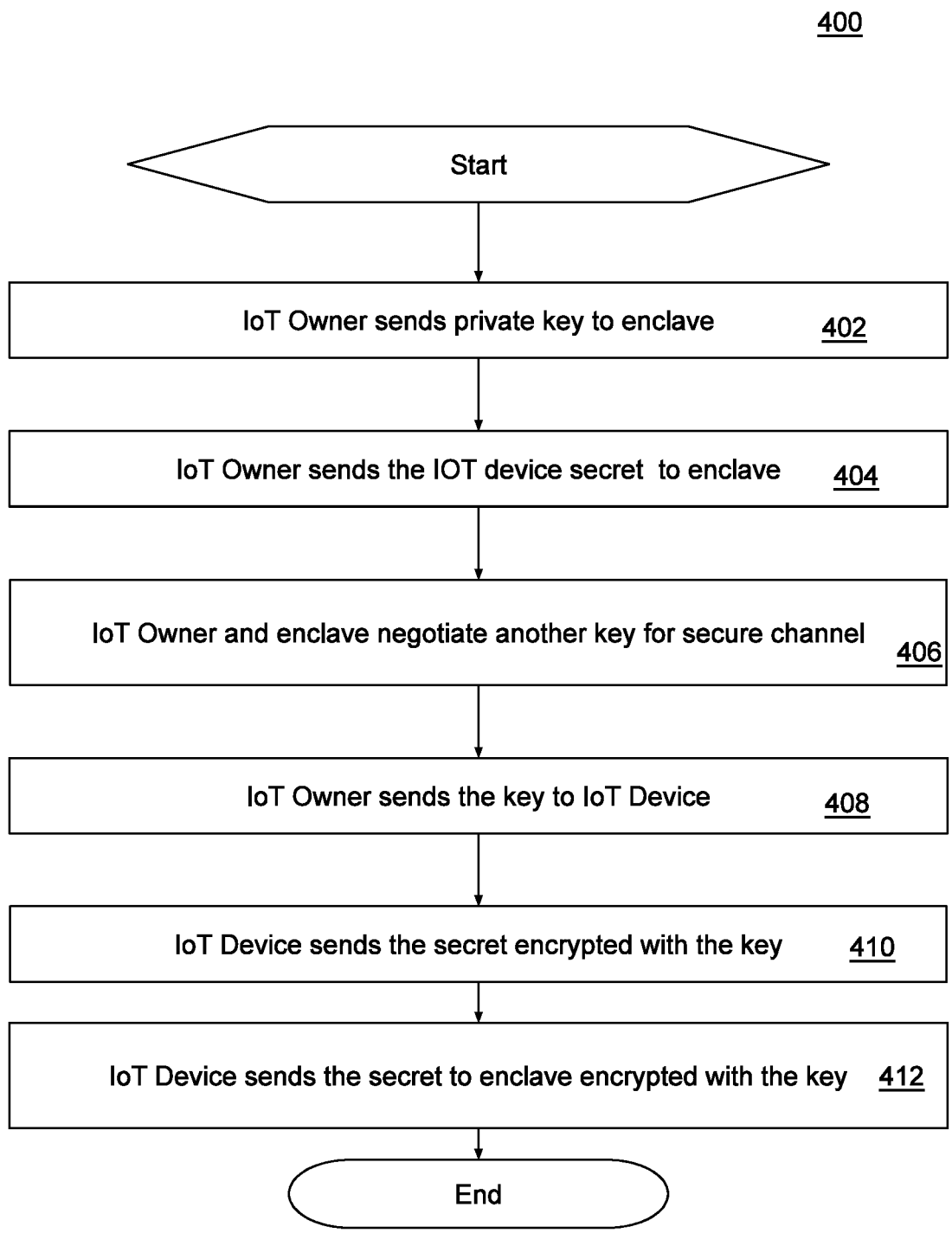
FIG. 4 is a flow chart illustrating a Secure channel setup procedure between IoT devices and the trust computing node.

FIG. 4 is a flow chart illustrating a Secure channel setup procedure 400 between IoT devices and the trust computing node. Once a secure channel is established between the IoT Owner and a trusted computing (e.g. SGX) Node, the enclave is now considered a trusted computing environment. The IoT Owner can pass an IoT device's secret keys to the enclave via the secure channel. In the meantime, the IoT device establishes a new secure channel with the enclave for subsequent communication. With the IoT device's secret keys, the enclave can now carry out operations on the blockchain on behalf of the IoT device according to the device's instructions.

IoT Owner sends private key to enclave 402. Next, IoT Owner sends the IOT device secret to enclave 404. IoT Owner and enclave negotiate another key for secure channel 406. IoT Owner sends the key to IoT Device 408. IoT Device sends the secret encrypted with the key 410. IoT Device sends the secret to enclave encrypted with the key 412.

Figure 5:
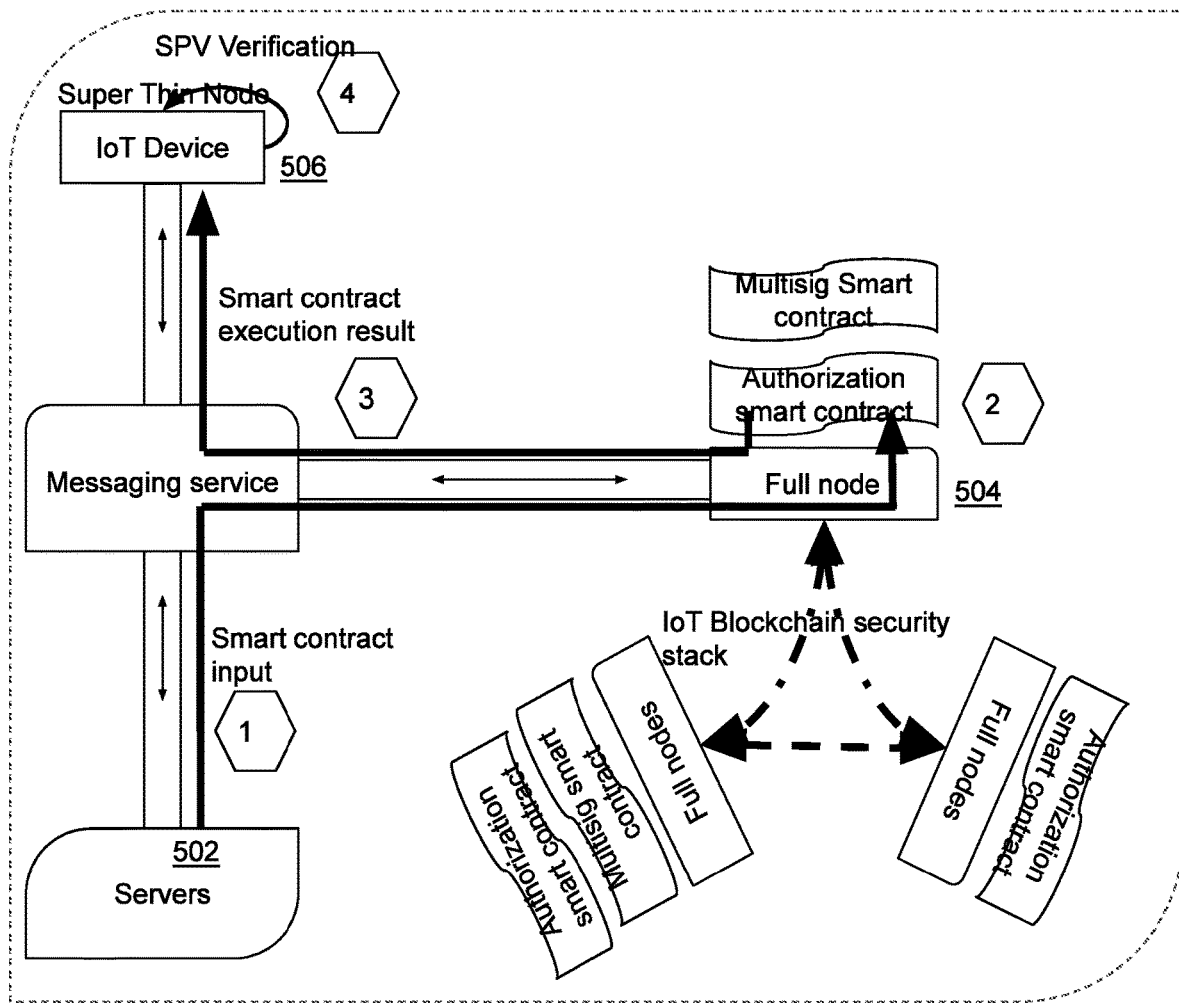
FIG. 5 is a block diagram illustrating a Message based IoT Security Architecture.

FIG. 5 is a block diagram illustrating a Message based IoT Security Architecture 500. An IoT device can use either TCP or UDP or other protocols for communication with the enclave. TCP requires more computing and network resources and doesn't natively support hibernation of devices, thus is more suitable for a device that is always online and has considerably strong computing and network capabilities. On the other hand, the connection less UDP is more suitable for weak devices with very limited resources.

Regardless of the protocols chosen, all communications between the IoT device and the enclave are encrypted. For TCP, the embodiments can encrypt data using symmetric encryption algorithms by specific applications, instead of the more traditional and generic Transport Layer Security (TLS). TLS requires asymmetric encryption algorithms which could become a burden for resource constrained IoT devices.

The solution can use Type-Length-Value (TLV) encoding scheme as the message format between an IoT device and an enclave. For example,

| Type | Length | Value |
|---|---|---|
| 0 | 1 | Type of operation |
| 1 | 2 | Sequence Number used in responses |
| 3 | variable | Length of the data payload with two most significant bits representing length of this field: 00—1 byte, 01—2 bytes, 10—3 bytes, 11—reserved |
| X | variable | Data payload with length indicated by the previous field |

Type of Operation:

| Value | Initiator | Description |
|---|---|---|
| 1 | IoT Device | Start a transaction; transaction body in data payload |
| 2 | IoT Device | Query status of a transaction; query statement in data payload |
| 3 | IoT Device | Monitor an event; event triggers in data payload |
| 4 | IoT Device | Send a message; message content in data payload |
| 129 | Enclave | Result of starting a transaction |
| 130 | Enclave | Result of a query |
| 131 | Enclave | Result of event monitoring setup |
| 192 | Enclave | Confirmation of a transaction |
| 193 | Enclave | Return event triggered |
| 194 | Enclave | Message destined for the IoT device |

Once it has chosen an enclave as its proxy, an IoT device can then execute operations on the blockchain just like all other participating nodes, including creating smart contracts, mining, starting transactions, querying the status of a transaction etc. It can also utilize any messaging functionalities provided by the blockchain network. It can further forward its generated data to the enclave so that the data can be permanently stored elsewhere. Operations can be initiated by either the IoT device or the enclave.

An IoT device can initiate an operation instructing the enclave to perform certain tasks, such as starting a transaction, querying the status of a transaction, setting up a smart contract etc. These operations can be further classified into two categories: those that need the IoT device's secret key such as starting a transaction or setting up a smart contract, and those that do not, such as querying transaction and setting up event triggers.

An enclave can initiate an operation too, which is usually a report of an event whose trigger has been previously set up by the IoT device.

Once it has chosen an enclave as its proxy, an IoT device can then execute operations on the blockchain just like all other participating nodes, including creating smart contracts, mining, starting transactions, querying the status of a transaction etc. It can also utilize any messaging functionalities provided by the blockchain network. It can further forward its generated data to the enclave so that the data can be permanently stored elsewhere. Operations can be initiated by either the IoT device or the enclave.

An IoT device can initiate an operation instructing the enclave to perform certain tasks, such as starting a transaction, querying the status of a transaction, setting up a smart contract etc. These operations can be further classified into two categories: those that need the IoT device's secret key such as starting a transaction or setting up a smart contract, and those that do not, such as querying transaction and setting up event triggers.

An enclave can initiate an operation too, which is usually a report of an event whose trigger has been previously set up by the IoT device.

System Roles:

Internet of Things device (hereinafter referred to as device): an actuator or data acquisition device at the edge of the network in the Internet of Things. IoT devices have the characteristics of single function, limited resources (computing, storage, network, energy), etc.

The server: The data collection unit, processing unit, storage unit, business logic unit, etc. in the Internet of Things. The central server has rich resources and diversified functions. The server currently has public cloud deployment method, public and private cloud combined hybrid deployment, and complete private cloud deployment method, etc.

The message channel between the device and the server (hereinafter referred to as the message channel) is used to complete the device data reporting, event reporting, and server instructions operations, etc. The message channel currently uses mature software solutions, such as HTTP messages and MQTT messages, etc.

Blockchain access nodes (hereinafter referred to as access nodes): Access nodes are mainly used to execute related smart contracts, export execution result with the corresponding message to the device.

Blockchain validator nodes store the corresponding private keys, sign the smart contracts and the results.

Full Node: the general name of the validator node and the access node. The full node records all transaction information, state information, etc. of the blockchain network.

Super thin node: refers specifically to the device.

Smart contract: smart contract runs on the blockchain nodes, including the access node of the blockchain and the validator nodes. The smart contract comprises input, execution logic, and output. It can be implemented with deterministic features.

Simple verification (SPV) is for resource-limited device to verify the authenticity of the messages.

The system mainly comprises the following components.

Smart contract data input sources. It could come from the server 502, or any part of the business process but the owner of the data needs to be able to sign the data to prove the ownership.

Blockchain network for device management. The blockchain comprises full nodes 504 and thin nodes 506. The full node records the public keys of the devices and the business logic (smart contracts) for managing the access of the devices. The thin node does not record any state but the validator set to validate the output and results of the smart contracts.

The output of the smart contracts. Smart contract output and results are stored in the blockchain network (full nodes). This method further defines what to be exported to the devices for verification. It includes the block header information, the hash values of the block and its Merkle proof.

Simple verification by the thin nodes. Due to limited resources, thin nodes cannot store all transactions and states of the blockchain, and cannot perform smart contract execution. However, thin nodes have the ability to validate the blocks and independently complete Merkle proof with the same security as the full nodes.

Figure 6:
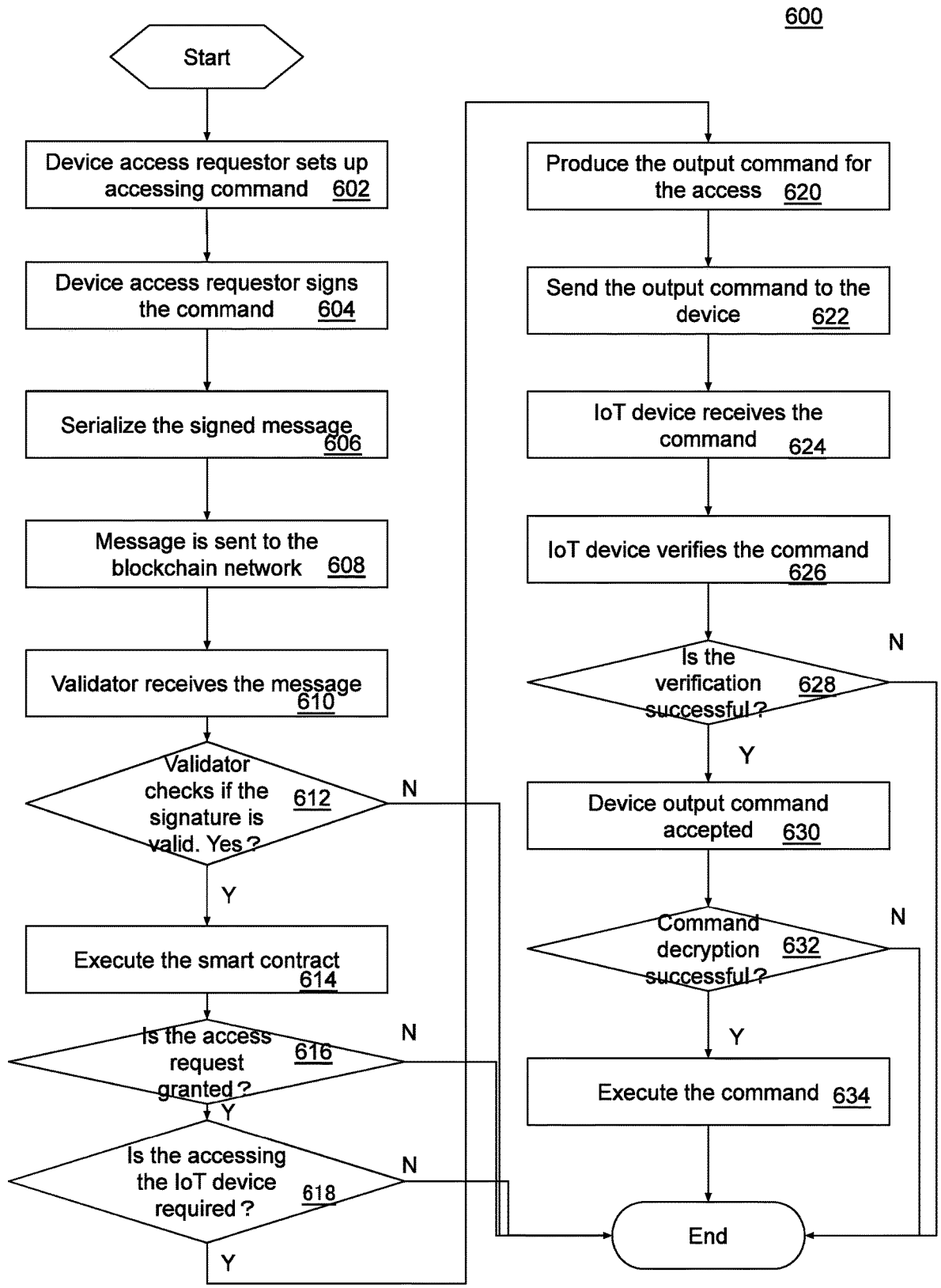
FIG. 6 is a flow chart illustrating a Device access procedure.

FIG. 6 is a flow chart illustrating a Device access procedure 600. The accessor with access rights sends relevant commands to the device. The access process needs to be coupled with the business logic, and the output is a message signed by the accessor (e.g., IoT owner) with device access rights 602-606.

Device access requestor sets up accessing command 602. Device access requestor signs the command 604. Messages are sent 608 to the blockchain network via the messaging system. The validator in the blockchain network receives the message 610 and finds the corresponding smart contract based on the message and sends the message to the smart contract. The smart contract records the access rights, access rules, etc. of the device. If the signature is valid 612, the contract runs 614 the relevant logic according to the input of the message. If access request is granted 616 and accessing the device required 618, the contract generates the corresponding access message 620, and stores the message to the corresponding block. After the block is generated, the corresponding access node of the device generates a proprietary verifiable message for the device according to the output of the contract in the block and sends 622 the message to the specific device through the message channel.

After the device receives 624 the message, it will perform the following 628:
- use the private key for asymmetric decryption 632 of the received message and exit if the decryption fails.
- validate the correctness of the block header information in the output message.
- validate the correctness of the hash result of the smart contract execution result in the block header.
- validate the received message and the Merkle tree, complete the Merkle proof from the Merkle tree to the contract execution result hash value in the block header.

After the above are completed and accepted 630, the device can execute the corresponding instructions 634.

Figure 7:
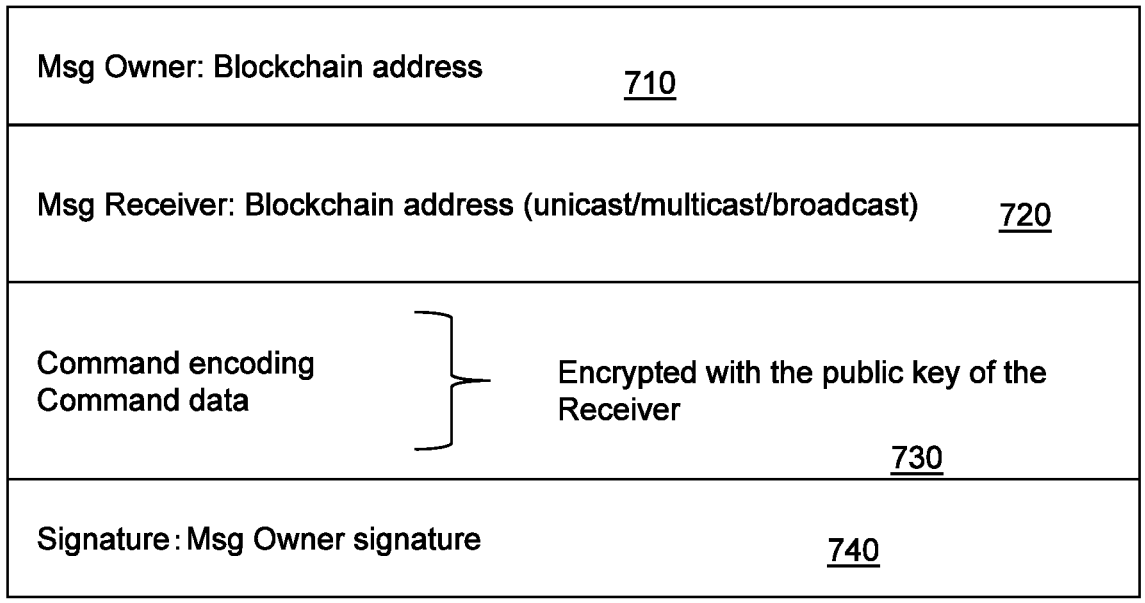
FIG. 7 is a block diagram illustrating a Data input format.

FIG. 7 is a block diagram illustrating a Data input format 700. The input format of the smart contract comprises the owner of the message 710, the receiver of the message 720, and the command 730. In order to prove that the message is sent by the owner of the message, the message needs to be signed 740 by the owner. The recipient of the message can be a unicast address, a broadcast address, or a multicast address.

The commands and the data carried by the commands 730 will be encrypted using the receiver's public key.

After the smart contract is encoded according to the above format, the message needs to be serialized to be transmitted on the network.

Access Node

Access node is directly connected to the device. Device needs to be registered in the access node to obtain the corresponding messages. After the registration is completed, the access node routes the corresponding message to the device. The blockchain network is a network with the same states, and the states of each access node is consistent. In the IoT network, it is not possible or scalable for all access nodes to send control messages to the same device. Therefore, the registration mechanism is introduced. The process of the registration mechanism refers to decided by the device side. The access node can produce a block but cannot vote on the consensus.

Verification/Validator Node

Verification/validator node is also a full node. The difference between the verification node and the access node is that the verification node needs to complete the block generation, voting in addition to the execution of the smart contract. Because the verification node needs to vote on the generated block, validating the security of the node is critical to the security of the entire network. The decentralized deployment of verification nodes helps to maintain system security even if ⅓ of the network is compromised. In order to protect the security of the verification node, verification node is not directly connected to the device.

In the cryptography category, the verification node can support two forms of private key:

The voting private key. The private key is used for the block generation voting. If a verification node agrees the transactions of the block. The verification node will use the private key to vote on the hash value of the block.

The shared secret key private key: This type of private key is used to validate that a common decision is made between the nodes through cryptographic cooperation. The shared secret key private key is a threshold private key, meaning, for a certain decision, as long as the voting authority of the signed verification node meets a certain threshold (for example, ⅔) it is considered approved.

Figure 8:
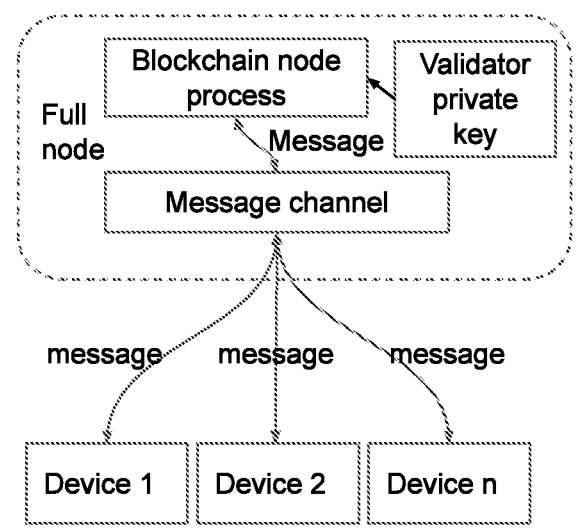
FIG. 8 is a diagram illustrating a Single-node deployment method.

FIG. 8 is a diagram illustrating a Single-node deployment method. The entire blockchain network has only one full node/verification node as shown. All voting power is placed in this node, and the blockchain network degenerates into a traditional centralized authority management server. Single-node deployment brings performance improvement with great security degradation. If the private key of the node is leaked, the entire security is compromised.

Figure 9:
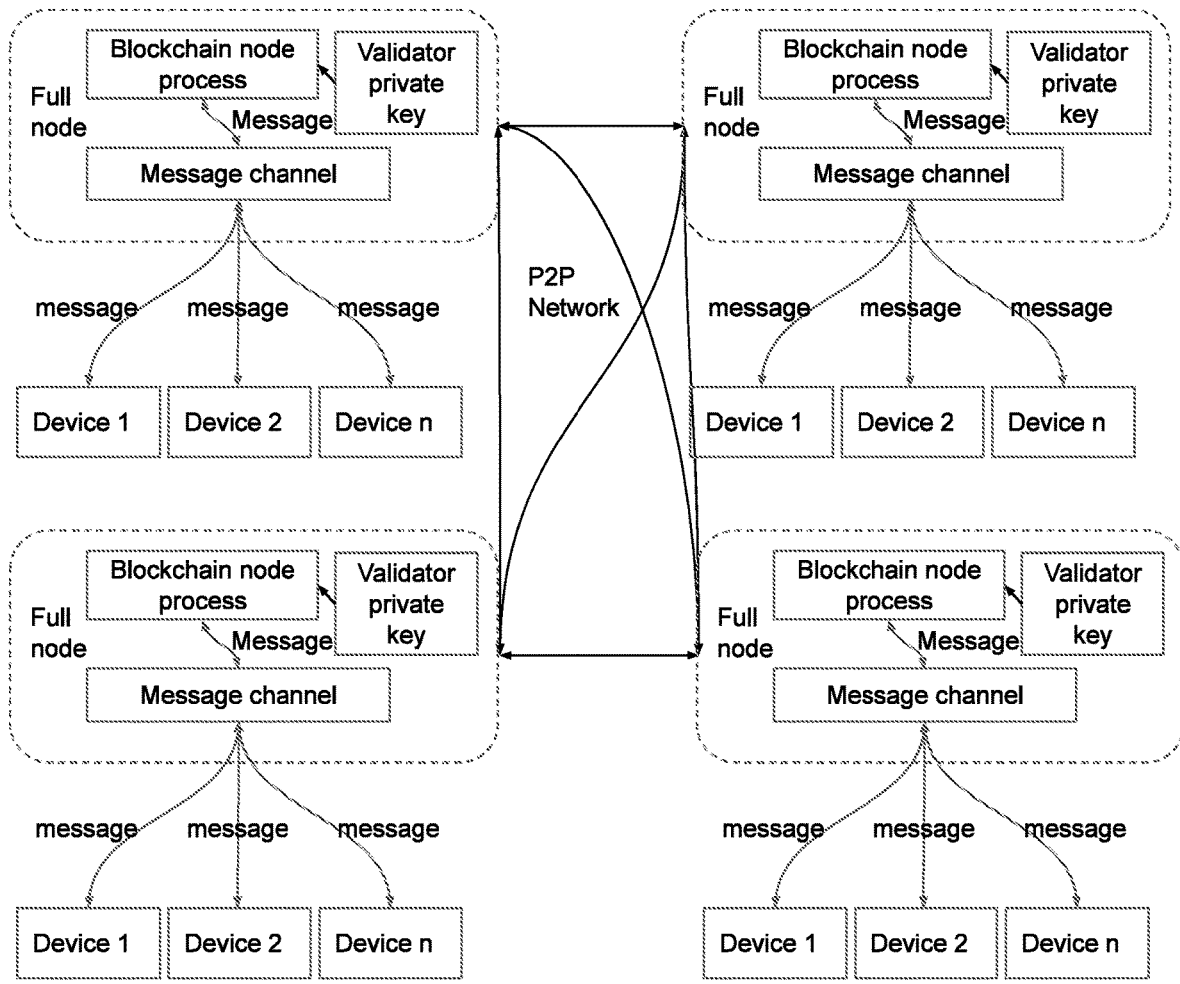
FIG. 9 is a diagram illustrating a Multi-node deployment method.

FIG. 9 is a diagram illustrating a Multi-node deployment method. Several full nodes together form a blockchain network. Voting rights are assigned to different nodes through certain rules. The security advantage of this approach is that controlling or attacking a node does not fully control the entire blockchain network.

Figure 10:
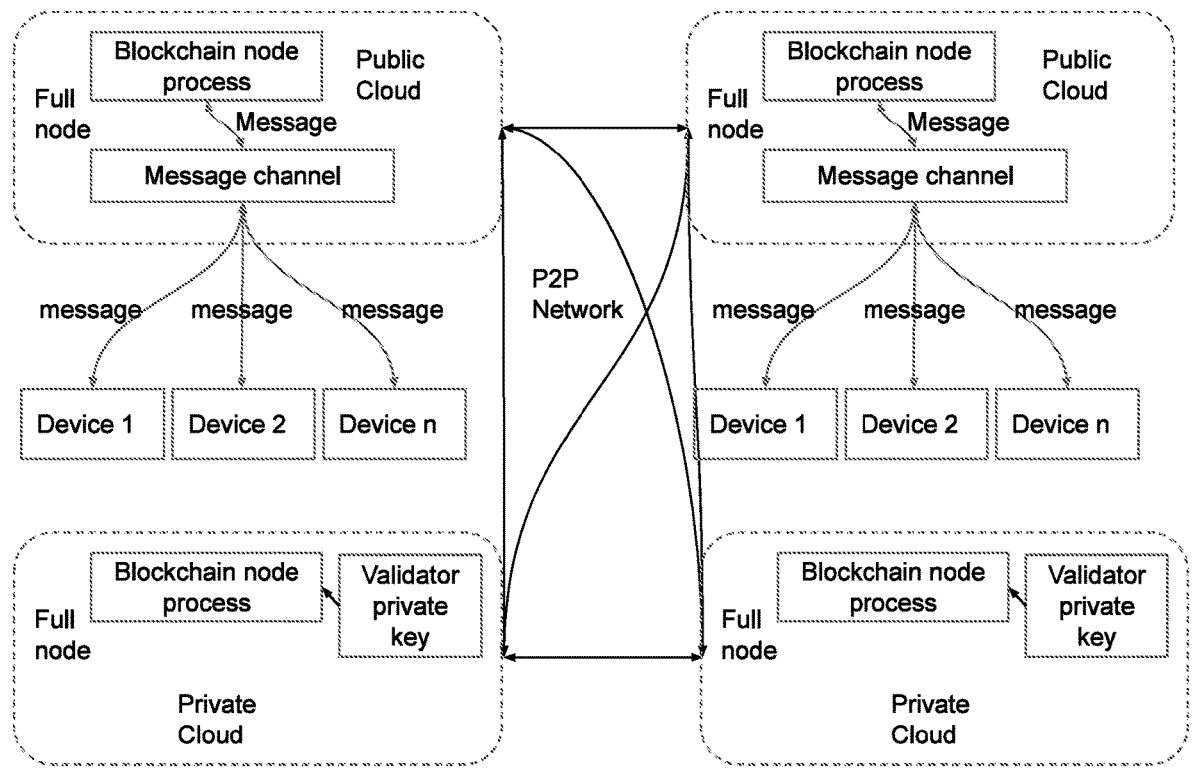
FIG. 10 is diagram illustrating a Enhanced multi-node deployment method.

FIG. 10 is a diagram illustrating a Enhanced multi-node deployment method. In an enhanced multi-node deployment scenario, full nodes with voting rights need to store private key information (in the form of files or in the form of hardware storage) and deployed in the private cloud/data center. Access nodes without voting authority can be deployed in the public cloud.

Figure 11:
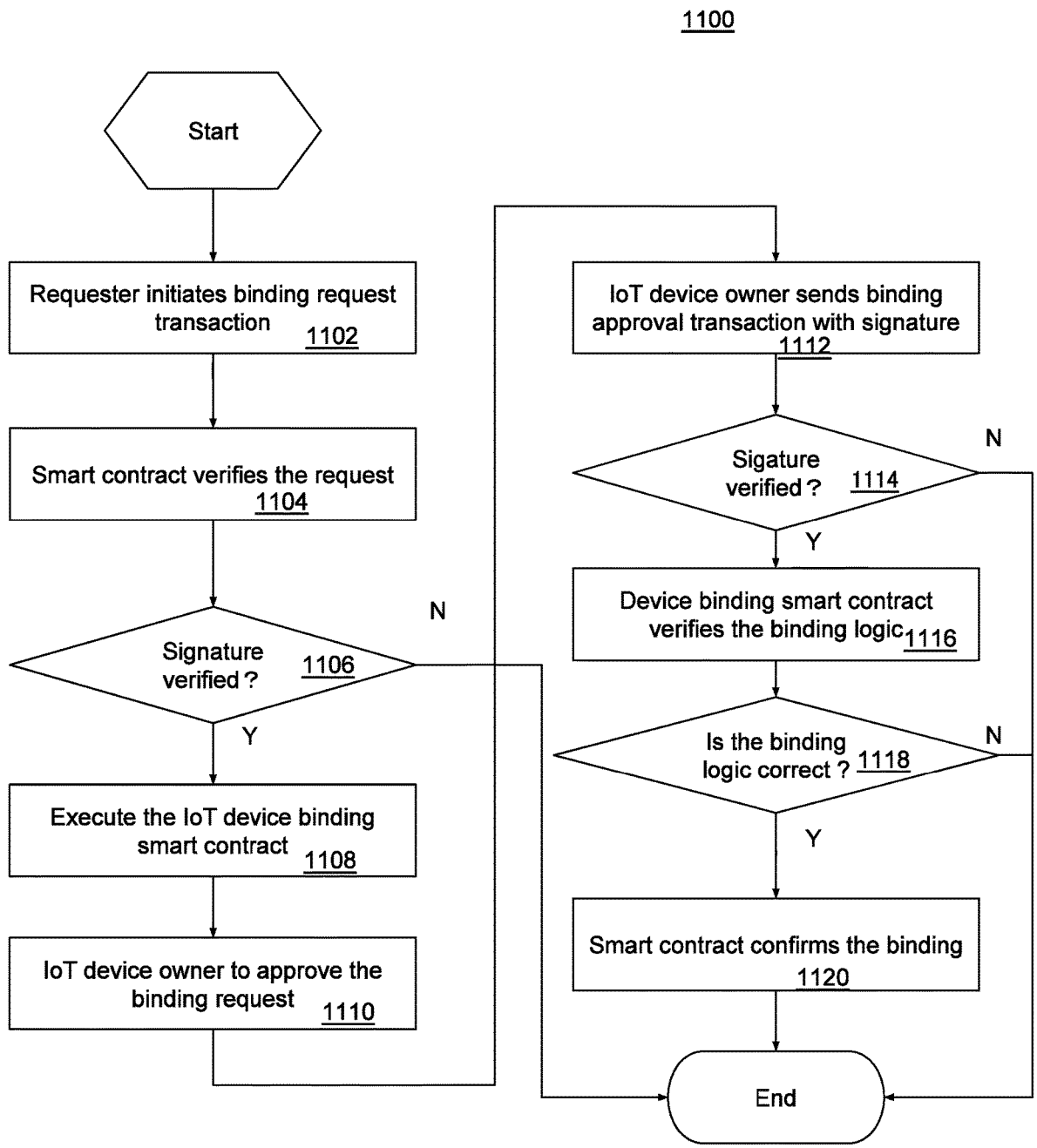
FIG. 11 is a flow chart illustrating a Device binding procedure.

FIG. 11 is a flow chart illustrating a Device binding procedure 1100.

Rights management contracts can complete the binding of devices permissions according to a variety of flexible ways, such as binding according to the time window, multi-signature binding for multiple users, etc. The specific binding process can be implemented by the smart contract.

The binding relationship between the device and the corresponding service object is completed in the binding smart contract. Device owner needs to use the device's private key to sign a binding contract to confirm the binding relationship between the device and the service object. The binding logic for example, can be time window based i.e. is valid within a certain period of time. It can also be a multi-party signature binding, that is, a device needs to be signed by multiple parties.

After the binding relationship is established. The binding relationship may be released. The binding release may be initiated by the service object, confirmed by the owner of the device, or directly by the owner of the device. The binding may also be forcibly released by the verification node through the shared key.

Figure 12:
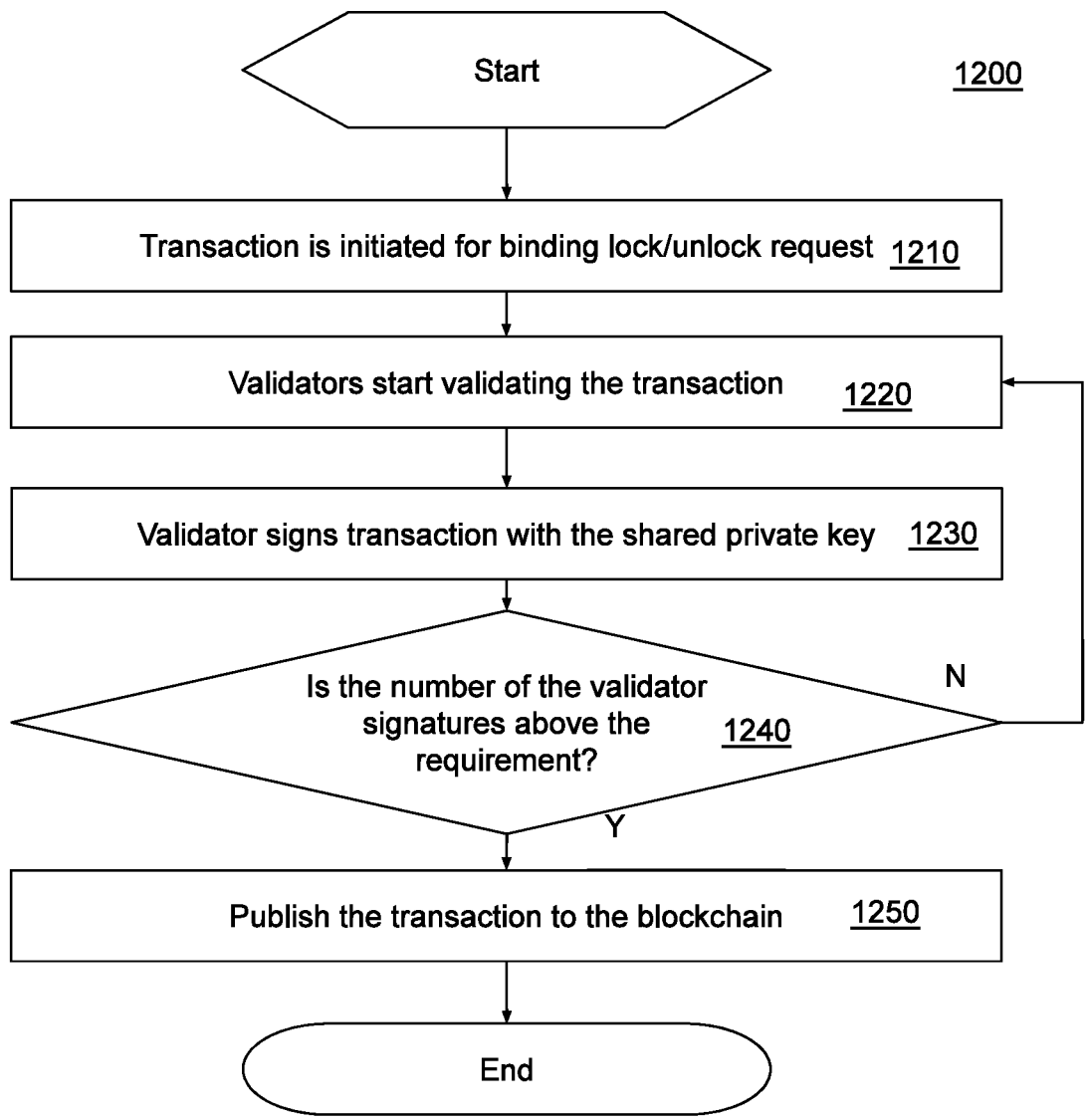
FIG. 12 is a flow chart illustrating a Device binding lock or unlock procedure.

Binding lock/unlock. The verification node can lock against the binding. In this mode, the binding relationship is locked by the verification node, and the service object cannot operate on the device. The service object can only be used after unlocking the device binding. The binding lock unlock process is performed by the verification node in the form of a shared secret key. The process of binding unlocking is shown in method 1200 (FIG. 12). After the validator receives the binding unlocking transaction, only the signature needs to be verified.

In the method 1100, the requester initiates binding request transaction 1102. The smart contract then verifies the request 1104. If the signature 1106 is verified, then the IoT device binding smart contract is executed 1108. IoT device owner approves 1110 the binding request and send binding approval transaction with signature 1112. If signature is verified 1114 then device binding smart contract verifies the binding logic 1116. IF correct 1118, then the smart contract confirms the binding 1120.

FIG. 12 is a flow chart illustrating a Device binding lock or unlock procedure. 1200. First, Transaction is initiated for binding lock/unlock request 1210. Validators start validating the transaction 1220. Validator signs transaction with the shared private key 1230. If the number of the validator signatures is above the requirement 1240, then transaction to the blockchain is published 1250.

Figure 13:
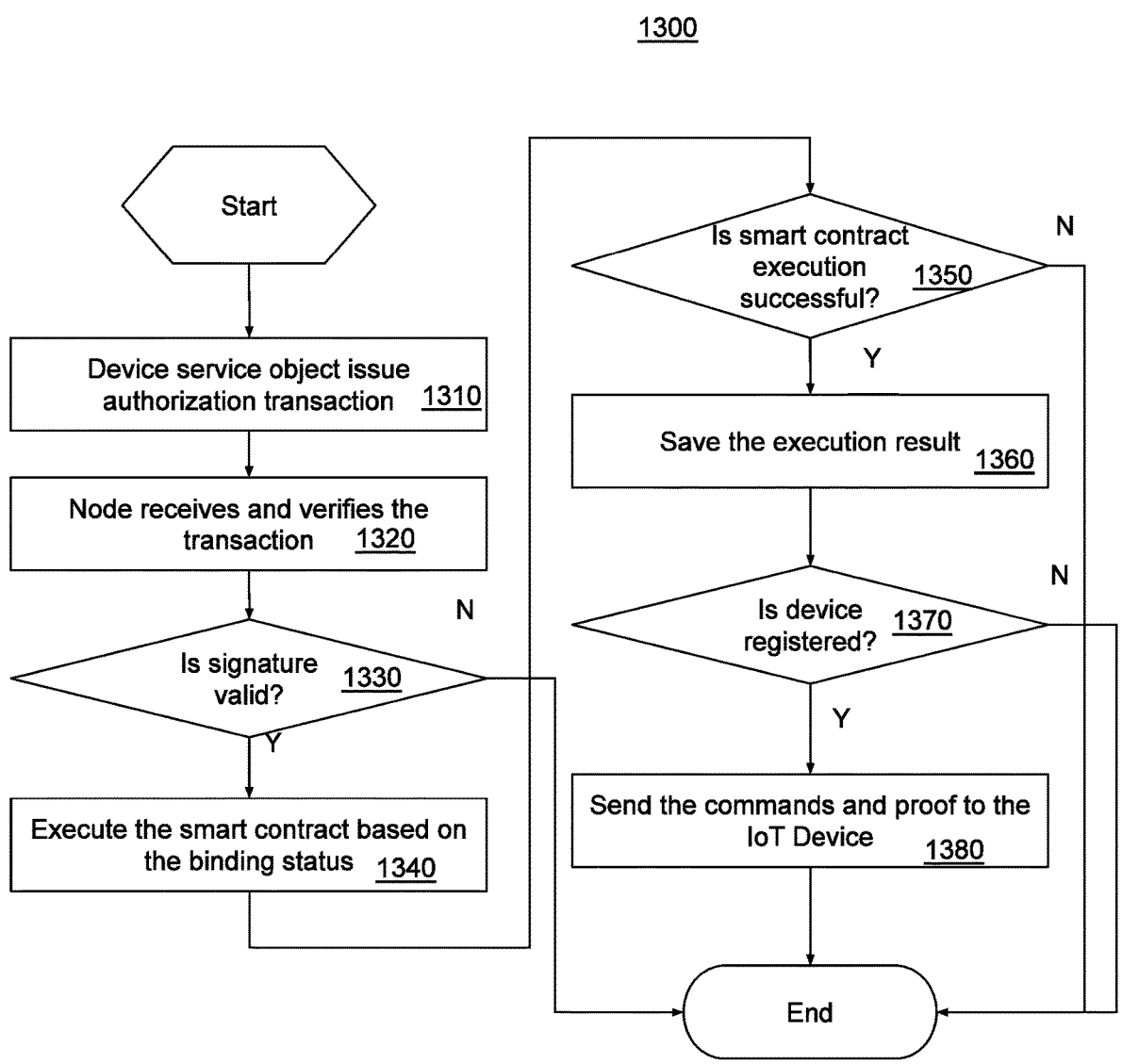
FIG. 13 is a flow chart illustrating a Procedure to check access authorization.

FIG. 13 is a flow chart illustrating a Procedure 1300 to check access authorization. First, Device service object issues 1310 authorization transaction. Node receives and verifies the transaction 1320. If 1330 the signature is valid, then execute the smart contract based on the binding status 1340. If smart contract execution is successful 1350 then the execution result is saved 1360. If 1370 the device is registered 1370, then send the commands and proof to the IoT Device 1380.

Figure 14:
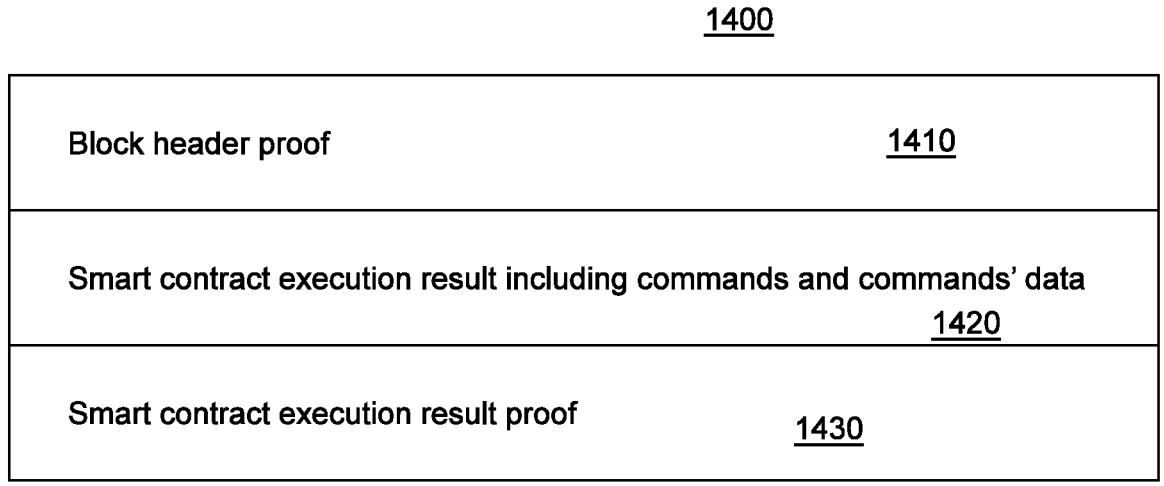
FIG. 14 is a block diagram illustrating a Node to IoT device message format.

FIG. 14 is a block diagram illustrating a Node to IoT device message format 1400. The format includes: a Block header proof 1410 that contains the hash value that makes up the block header, the formed Merkle tree for each element in the block header, the validator signature set.

An execution result 1420 of the contract includes the executed command and the result data. The data of the execution result is stored in the data in encrypted form. The device can decrypt the data using its own private key and operate according to the corresponding command instructions of the data.

A Merkle proof 1430 of the result of the contract execution to prove the correctness of the contract execution results.

Figure 15:
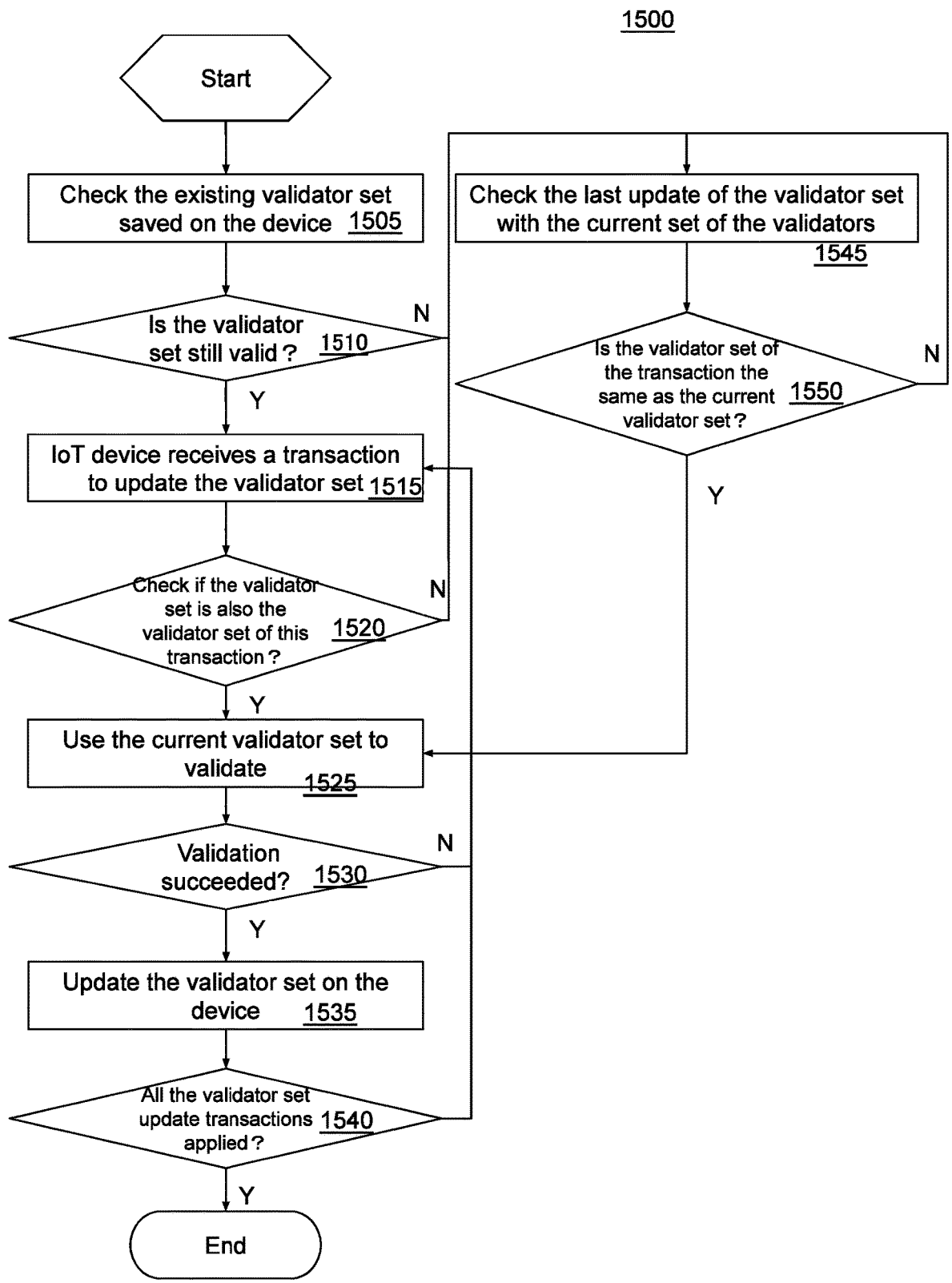
FIG. 15 is a flow chart illustrating a Validator set update method.

FIG. 15 is a flow chart illustrating a Validator set update method 1500. A device does not store the state of the blockchain itself due to the limitations of its resources. Therefore, the device cannot independently validate the legality of the transaction and the security of the transaction. The device relies on maintaining the correct set of validators. After the device receives the command, it needs to validate the authenticity of both the validator set and the command. Verification of both is based on verification of the received message, from the block header, to the final transaction or execution result.

The device may reliably store the set of validators, which can be updated, or deleted. The update of the validator set is a chain process. The old validator set validates the new set of validators, and so on, it forms the validator set chain.

The method 1500 comprises check the existing validator set saved on the device 1500. If still valid (1510), the IoT device receives 1515 a transaction to update the validator set. If the validator set is also the validator set of the received transaction 1520, then the device uses the current validator set to validate 1525. If not, then the device checks the last update of the validator set with the current set of the validators 1545. If the validator set of the transaction is the same as the current validator set 1550, then the device uses the current validator set to validate 1525.

If 1530 validation is successful, the device updates the validator set on the device 1535. The method 1500 then ends if all the validator set update transactions applied 1540. Otherwise, the method 1500 repeats.

Figure 16:
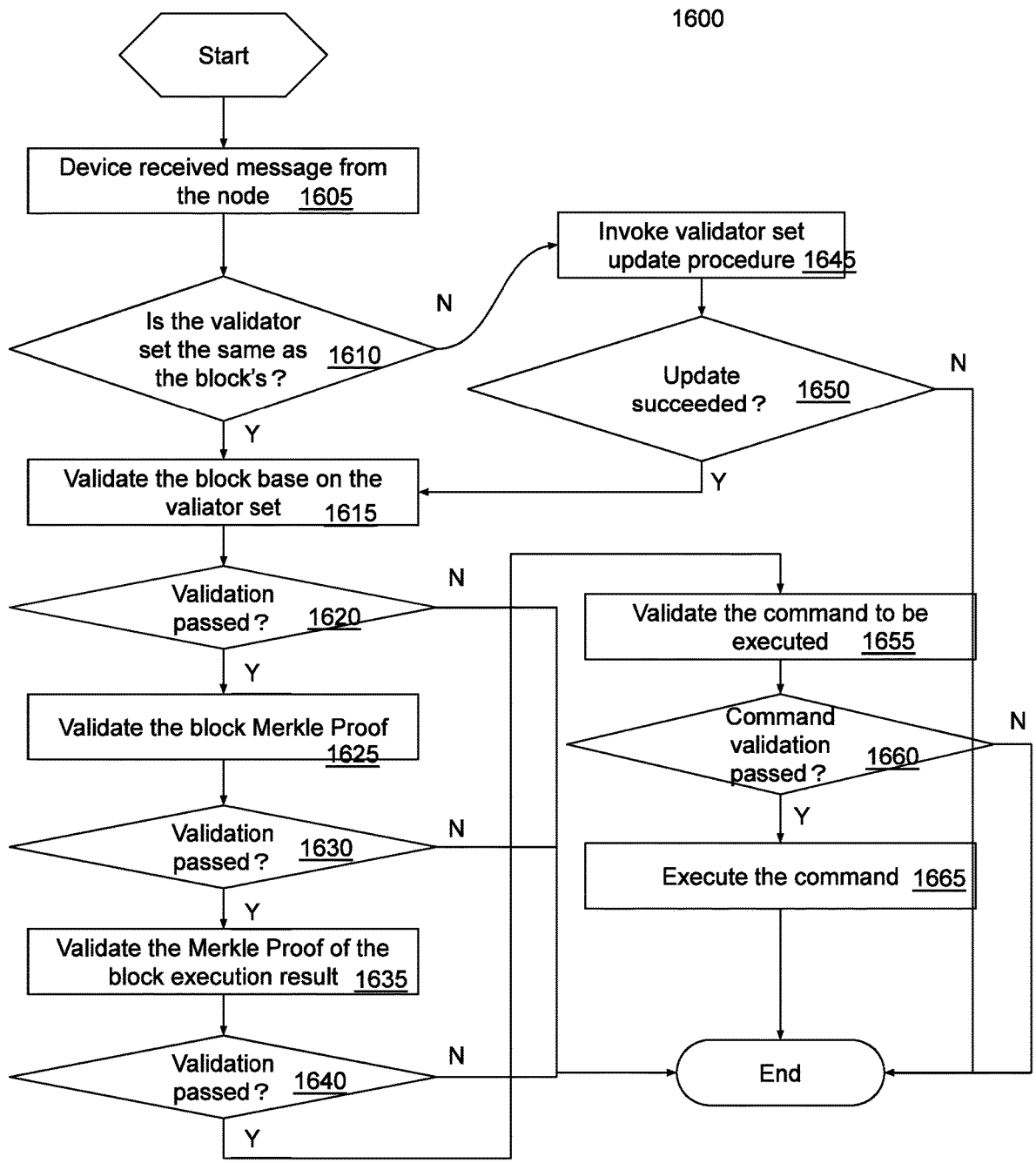
FIG. 16 is a flow chart illustrating a Command verification procedure.

FIG. 16 is a flow chart illustrating a Command verification procedure 1600. When a device service object sends a command to a device, the command is first validated through the blockchain network to generate a transaction, in which the signature of the entire validator set is included instead of the device service object's signature.

A Device receives 1605 a message from the node. If 1610 the validator set is not the same as the block, then invoke validator set update procedure 1645. If 1650 succeeds or blocks are same, the validate the block base on the validator set 1615. If 1620 validation passed, then validate the block Merkle Proof 1625. If 1630 validation passed, then validate the Merkle Proof of the block execution result 1635. If 1640 validation passed, then Validate the command to be executed 1655. If 1660 validation passed then the command is executed 1665.

Figure 17:
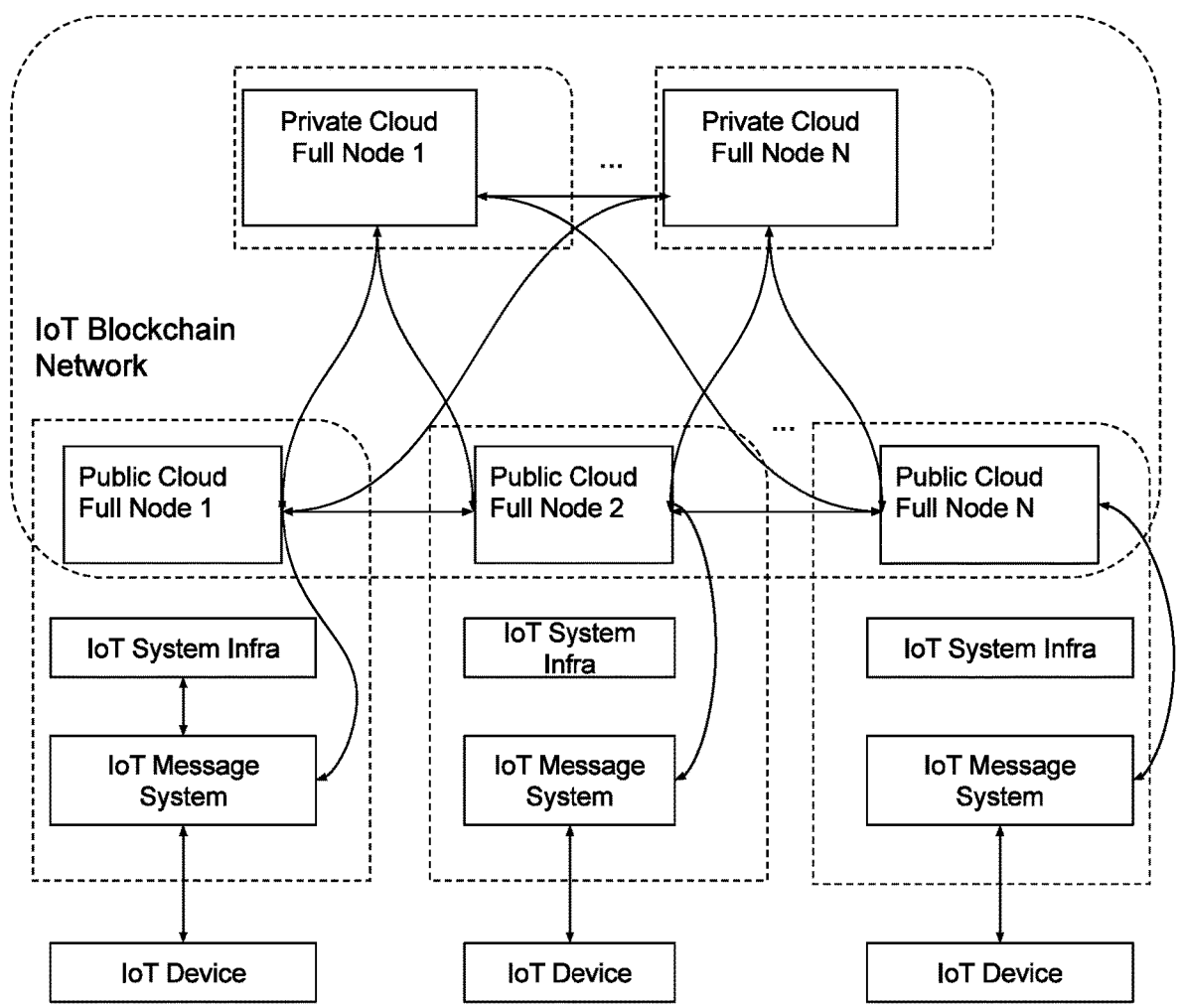
FIG. 17 is a block diagram illustrating a Cloud deployment example.

FIG. 17 is a block diagram illustrating a Cloud deployment example. In this embodiment, the security system runs on the public cloud and is connected into the current customer's business system as a service.

As an example, a production line device may contain data of the production line status including number of products built or the components used. A loan approval for supply chain financing can be made with data from the production line. However, the owner of the factory may not want to give up the information verbatim. Hence they can use the 3rd party trusted computing to carry out a verification code with the data in the IoT device on the production line without giving up the data to the loan approver.

In a machinery example, there are sensors built into heavy machineries for the usage and duration of the operations et al that may be helpful to predict when the machinery may need to be updated or serviced. Again the data may be trade secrets for the owner of the machinery so there is a need to use this solution for the third party vendors to check and validate the data with the trust computing environment provided by this solution for one time access to the data and payment collection.

There are also cases that may not involve IoT data access but to provide the business transaction among IoT devices. For example, in the case of shared economy, a smart lock, as an IoT device may work with the customer directly to collect payment and provide access to the key/lock. In the case of driverless cars, the cars, as IoT devices, may collaborate with each other for cutting into a line or getting priority for a busy lane. e.g. a car can pay the nearby 10 cars in the line to get in front of them like one will have to wave and get into a busy queue of the exit today. Or the cars can pay the IoT devices on the express line directly for express lane fees instead of relying on a centralized payment system that an out of town car may not have been participating.

The existing connection-oriented scheme, the security protection is weak. If one of the nodes is compromised, it will allow an intruder to enter the whole network and the entire security mechanism fails. It also requires high maintenance costs to maintain the state of the connection, and cannot meet the needs of massive IoT device access. Low power consumption is a typical requirement of IoT devices. Based on connection-oriented security solutions such as VPN and TLS, device energy management faces challenges due to the need to maintain the connectivity.

Accordingly, embodiments provide an authorization mechanism separate from the device by introducing a validator set, and the smart contract. A smart contract-based authorization mechanism, the authorization logic is completed by a smart contract. Contract implementation can be fast, convenient, and easy to manage.

Embodiments for separating the authorization from the device do not require a firmware upgrade, and can dynamically change the authorization logic using a conventional programming language.

Software Architecture

Figure 18:
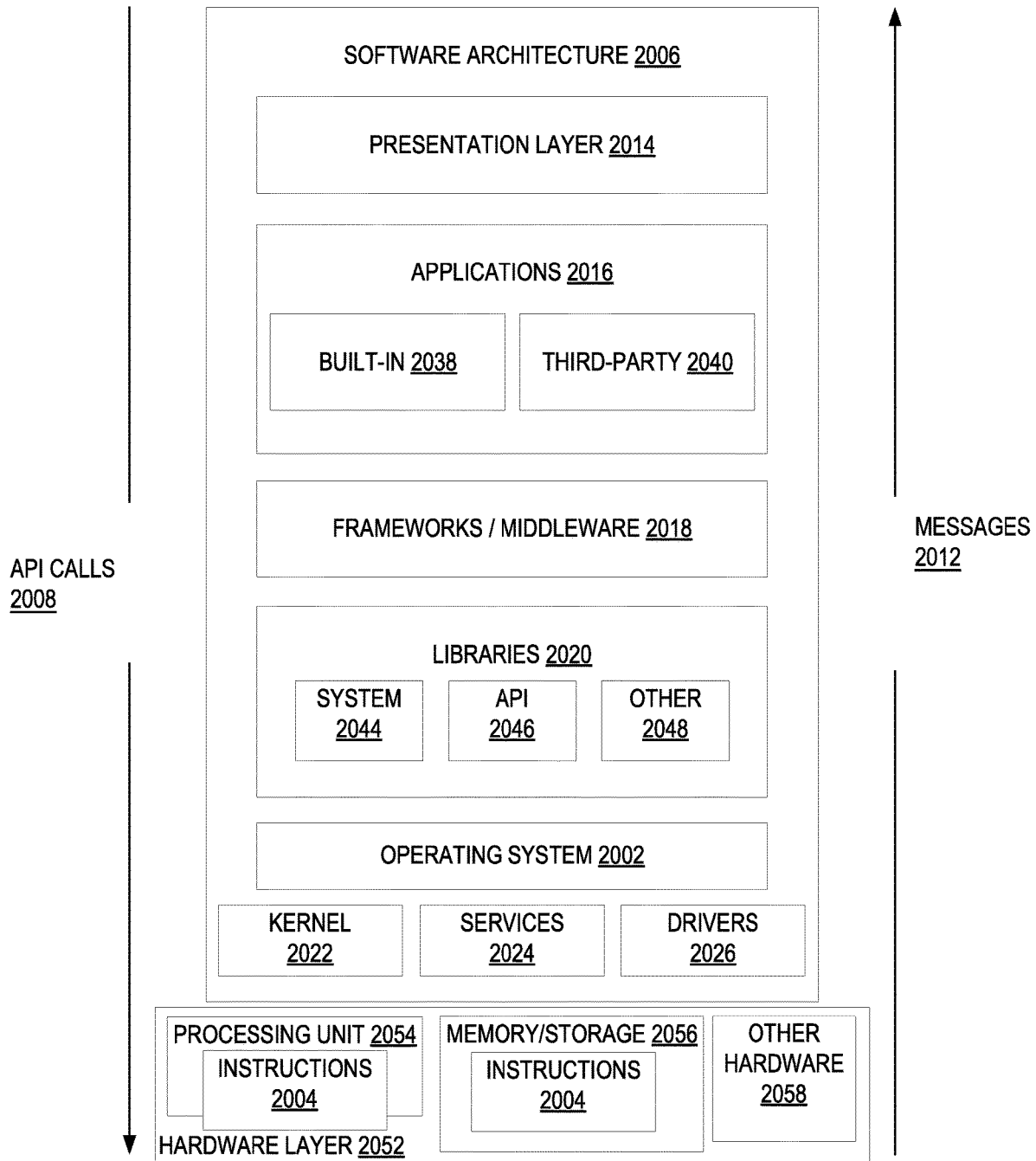
FIG. 18 is a block diagram illustrating a representative software architecture, which may be used in conjunction with various hardware architectures herein described.

FIG. 18 is a block diagram illustrating an example software architecture 2006, which may be used in conjunction with various hardware architectures herein described. FIG. 18 is a non-limiting example of a software architecture 2006 and it will be appreciated that many other architectures may be implemented to facilitate the functionality described herein. The software architecture 2006 may execute on hardware such as machine 2100 of FIG. 19 that includes, among other things, processors 2104, memory 2114, and (input/output) I/O components 2118. A representative hardware layer 2052 is illustrated and can represent, for example, the machine 2100 of FIG. 19. The representative hardware layer 2052 includes a processing unit 2054 having associated executable instructions 2004. Executable instructions 2004 represent the executable instructions of the software architecture 2006, including implementation of the methods, components, and so forth described herein. The hardware layer 2052 also includes memory and/or storage modules memory/storage 2056, which also have executable instructions 2004. The hardware layer 2052 may also comprise other hardware 2058.

In the example architecture of FIG. 18, the software architecture 2006 may be conceptualized as a stack of layers where each layer provides particular functionality. For example, the software architecture 2006 may include layers such as an operating system 2002, libraries 2020, frameworks/middleware 2018, applications 2016, and a presentation layer 2014. Operationally, the applications 2016 and/or other components within the layers may invoke API calls 2008 through the software stack and receive a response such as messages 2012 in response to the API calls 2008. The layers illustrated are representative in nature and not all software architectures have all layers. For example, some mobile or special purpose operating systems may not provide a frameworks/middleware 2018, while others may provide such a layer. Other software architectures may include additional or different layers.

The operating system 2002 may manage hardware resources and provide common services. The operating system 2002 may include, for example, a kernel 2022, services 2024, and drivers 2026. The kernel 2022 may act as an abstraction layer between the hardware and the other software layers. For example, the kernel 2022 may be responsible for memory management, processor management (e.g., scheduling), component management, networking, security settings, and so on. The services 2024 may provide other common services for the other software layers. The drivers 2026 are responsible for controlling or interfacing with the underlying hardware. For instance, the drivers 2026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 2020 provide a common infrastructure that is used by the applications 2016 and/or other components and/or layers. The libraries 2020 provide functionality that allows other software components to perform tasks in an easier fashion than to interface directly with the underlying operating system 2002 functionality (e.g., kernel 2022, services 2024 and/or drivers 2026). The libraries 2020 may include system libraries 2044 (e.g., C standard library) that may provide functions such as memory allocation functions, string manipulation functions, mathematical functions, and the like. In addition, the libraries 2020 may include API libraries 2046 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2020 may also include a wide variety of other libraries 2048 to provide many other APIs to the applications 2016 and other software components/modules.

The frameworks/middleware 2018 (also sometimes referred to as middleware) provide a higher-level common infrastructure that may be used by the applications 2016 and/or other software components/modules. For example, the frameworks/middleware 2018 may provide various graphic user interface (GUI) functions, high-level resource management, high-level location services, and so forth. The frameworks/middleware 2018 may provide a broad spectrum of other APIs that may be used by the applications 2016 and/or other software components/modules, some of which may be specific to a particular operating system 2002 or platform.

The applications 2016 include built-in applications 2038 and/or third-party applications 540. Examples of representative built-in applications 2038 may include, but are not limited to, a contacts application, a browser application, a book reader application, a location application, a media application, a messaging application, and/or a game application. Third-party applications 2040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 2040 may invoke the API calls 2008 provided by the mobile operating system (such as operating system 2002) to facilitate functionality described herein.

The applications 2016 may use built in operating system functions (e.g., kernel 2022, services 2024 and/or drivers 2026), libraries 2020, and frameworks/middleware 2018 to create user interfaces to interact with users of the system. Alternatively, or additionally, in some systems, interactions with a user may occur through a presentation layer, such as presentation layer 2014. In these systems, the application/component "logic" can be separated from the aspects of the application/component that interact with a user.

Figure 19:
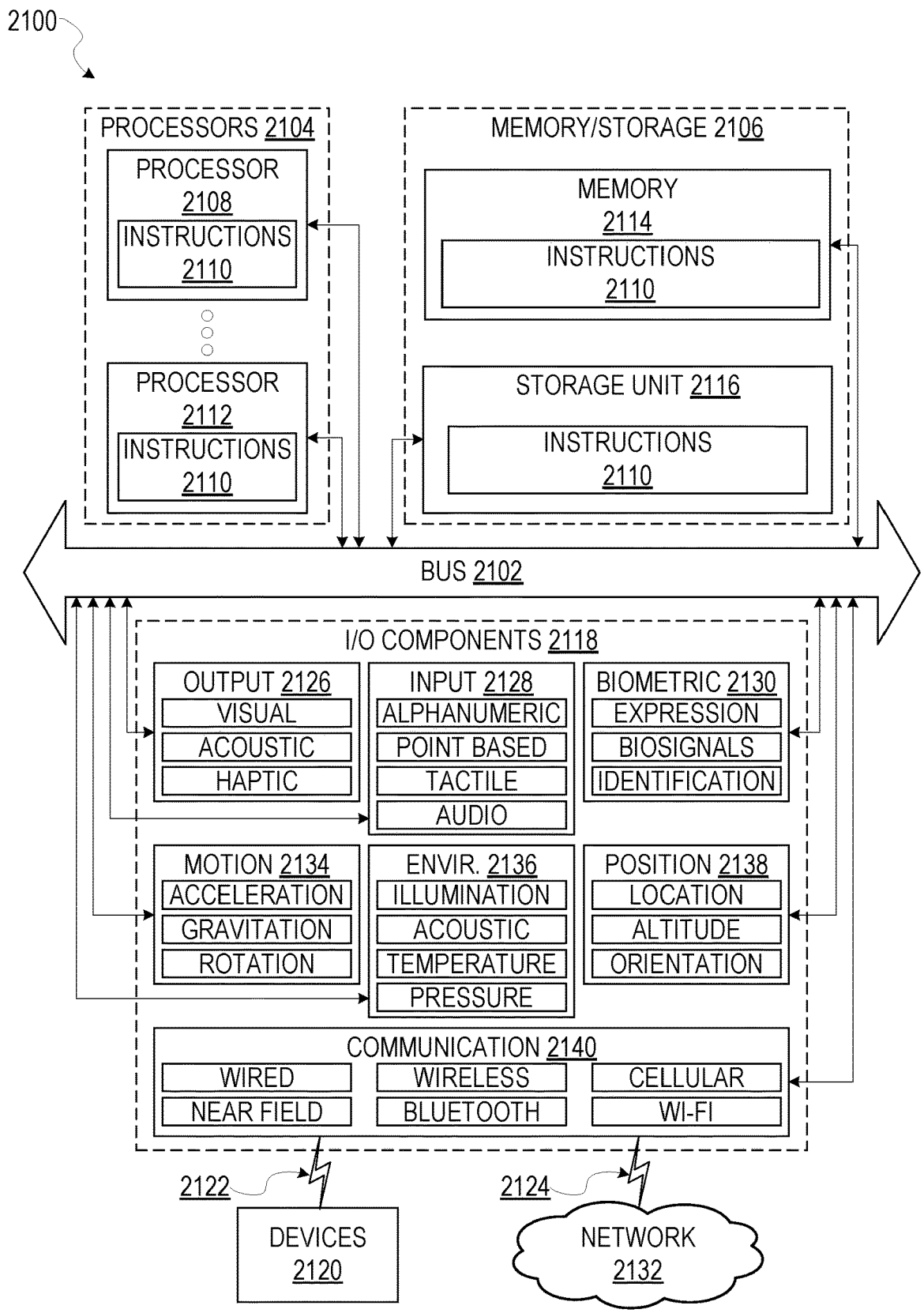

FIG. 19 is a block diagram illustrating components of a machine 2100, according to some example embodiments, able to read instructions 2104 from a machine-readable medium (e.g., a machine-readable storage medium) and perform any one or more of the methodologies discussed herein. Specifically, FIG. 19 shows a diagrammatic representation of the machine 2100 in the example form of a computer system, within which instructions 2110 (e.g., software, a program, an application, an applet, an app, or other executable code) for causing the machine 2100 to perform any one or more of the methodologies discussed herein may be executed. As such, the instructions 2110 may be used to implement modules or components described herein. The instructions 2110 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2110, sequentially or otherwise, that specify actions to be taken by machine 2100. Further, while only a single machine 600 is illustrated, the term "machine" shall also be taken to include a collection of machines that individually or jointly execute the instructions 2110 to perform any one or more of the methodologies discussed herein.

The machine 2100 may include processors 2104, memory/storage 2106, and I/O components 2118, which may be configured to communicate with each other such as via a bus 2102. The memory/storage 2106 may include a memory 2114, such as a main memory, or other memory storage, and a storage unit 2116, both accessible to the processors 2104 such as via the bus 2102. The storage unit 2116 and memory 2114 store the instructions 2110 embodying any one or more of the methodologies or functions described herein. The instructions 2110 may also reside, completely or partially, within the memory 2114, within the storage unit 2116, within at least one of the processors 2104 (e.g., within the processor's cache memory), or any suitable combination thereof, during execution thereof by the machine 2100. Accordingly, the memory 2114, the storage unit 2116, and the memory of processors 2104 are examples of machine-readable media.

The I/O components 2118 may include a wide variety of components to receive input, provide output, produce output, transmit information, exchange information, capture measurements, and so on. The specific I/O components 2118 that are included in a particular machine 2100 will depend on the type of machine. For example, portable machines such as mobile phones will likely include a touch input device or other such input mechanisms, while a headless server machine will likely not include such a touch input device. It will be appreciated that the I/O components 2118 may include many other components that are not shown in FIG. 21. The I/O components 2118 are grouped according to functionality merely for simplifying the following discussion and the grouping is in no way limiting. In various example embodiments, the I/O components 2118 may include output components 2126 and input components 2128. The output components 2126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2118 may include biometric components 2130, motion components 2134, environmental components 2136, or position components 2138 among a wide array of other components. For example, the biometric components 2130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2134 may include acceleration sensor components (e.g., accelerometer), gravitation sensor components, rotation sensor components (e.g., gyroscope), and so forth. The environmental components 2136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2118 may include communication components 2140 operable to couple the machine 2100 to a network 2132 or devices 2120 via coupling 2124 and coupling 2122, respectively. For example, the communication components 2140 may include a network interface component or other suitable device to interface with the network 2132. In further examples, communication components 2140 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2120 may be another machine or any of a wide variety of peripheral devices (e.g., a peripheral device coupled via a USB).

Moreover, the communication components 2140 may detect identifiers or include components operable to detect identifiers. For example, the communication components 640 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2140, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 2110 for execution by the machine 2100, and includes digital or analog communications signals or other intangible medium to facilitate communication of such instructions 2110. Instructions 2110 may be transmitted or received over the network 2132 using a transmission medium via a network interface device and using any one of a number of well-known transfer protocols.

"CLIENT DEVICE" in this context refers to any machine 2100 that interfaces to a communications network 2132 to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 2132.

"COMMUNICATIONS NETWORK" in this context refers to one or more portions of a network 2132 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 2132 or a portion of a network 2132 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 2110 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 2110. The term "machine-readable medium" shall also be taken to include any medium, or combination of multiple media, that is capable of storing instructions 2110 (e.g., code) for execution by a machine 2100, such that the instructions 2110, when executed by one or more processors 2104 of the machine 2100, cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 2104) may be configured by software (e.g., an application 2016 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 2104 or other programmable processor 2104. Once configured by such software, hardware components become specific machines 2100 (or specific components of a machine 2100) uniquely tailored to perform the configured functions and are no longer general-purpose processors 2104. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware componene"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 2104 configured by software to become a special-purpose processor, the general-purpose processor 2104 may be configured as respectively different special-purpose processors (e.g., comprising different hardware components) at different times. Software accordingly configures a particular processor or processors 2104, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 2102) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 2104 that are temporarily configured (e.g., by software) or permanently configured to perform the relevant operations. Whether temporarily or permanently configured, such processors 2104 may constitute processor-implemented components that operate to perform one or more operations or functions described herein. As used herein, "processor-implemented component" refers to a hardware component implemented using one or more processors 2104. Similarly, the methods described herein may be at least partially processor-implemented, with a particular processor or processors 2104 being an example of hardware. For example, at least some of the operations of a method may be performed by one or more processors 2104 or processor-implemented components. Moreover, the one or more processors 2104 may also operate to support performance of the relevant operations in a "cloud computing" environment or as a "software as a service" (SaaS). For example, at least some of the operations may be performed by a group of computers (as examples of machines 2100 including processors 2104), with these operations being accessible via a network 2132 (e.g., the Internet) and via one or more appropriate interfaces (e.g., an API). The performance of certain of the operations may be distributed among the processors 2104, not only residing within a single machine 2100, but deployed across a number of machines 2000. In some example embodiments, the processors 2104 or processor-implemented components may be located in a single geographic location (e.g., within a home environment, an office environment, or a server farm). In other example embodiments, the processors 2104 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 2100. A processor 2104 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 2104 (sometimes referred to as "cores") that may execute instructions 2110 contemporaneously.

What is claimed is:

1. A computer-implemented method, comprising:
   selecting a trusted computing node via smart contract on a blockchain;
   completing remote attestation of the selected trusted computing node;
   writing secret information to an enclave of the selected node;
   causing a thin device to establish an encrypted private connection with the selected node without revealing the secret information; and
   causing the selected node to act as a proxy on the blockchain for the thin device.

2. The method of claim 1, wherein the smart contract includes hardware parameters of the selected computing node.

3. The method of claim 1, further comprising transmitting secret keys of the thin device to the selected node via secure channel.

4. The method of claim 1, wherein the causing the selected node to act as a proxy includes performing a transaction on the blockchain on behalf of the thin device.

5. The method of claim 1, further comprising causing the thin device to validate a result from the proxy.

6. A machine-readable storage device embodying instructions that, when executed by a machine, cause the machine to perform operations comprising:
   selecting a trusted computing node via smart contract on a blockchain;
   completing remote attestation of the selected trusted computing node;
   writing secret information to an enclave of the selected node;
   causing a thin device to establish an encrypted private connection with the selected node without revealing the secret information; and
   causing the selected node to act as a proxy on the blockchain for the thin device.

7. The device of claim 6, wherein the smart contract includes hardware parameters of the selected computing node.

8. The device of claim 6, wherein the operations further comprise transmitting secret keys of the thin device to the selected node via secure channel.

9. The device of claim 6, wherein the causing the selected node to act as a proxy includes performing a transaction on the blockchain on behalf of the thin device.

10. The machine-readable storage device embodying instructions that of claim 6, wherein the operations further comprise causing the thin device to validate a result from the proxy.

11. An apparatus comprising:
    at least one processor; and
    a non-transitory memory having instructions stored thereon to cause the at least one processor to execute a method, the method comprising:
    selecting a trusted computing node via smart contract on a blockchain;
    completing remote attestation of the selected trusted computing node;
    writing secret information to an enclave of the selected node;
    causing a thin device to establish an encrypted private connection with the selected node without revealing the secret information; and
    causing the selected node to act as a proxy on the blockchain for the thin device.

12. The apparatus of claim 11, wherein the smart contract includes hardware parameters of the selected computing node.

13. The apparatus of claim 11, wherein the method further comprises transmitting secret keys of the thin device to the selected node via secure channel.

14. The apparatus of claim 11, wherein the causing the selected node to act as a proxy includes performing a transaction on the blockchain on behalf of the thin device.

15. The apparatus of claim 11, wherein the method further comprises causing the thin device to validate a result from the proxy.

* * * * *